(12) United States Patent
Wang et al.

(10) Patent No.: US 9,803,117 B2
(45) Date of Patent: Oct. 31, 2017

(54) FRAME-SEALING AGENT, DISPLAY PANEL AND DISPLAY DEVICE

(71) Applicants: BOE Technology Group Co., Ltd., Beijing (CN); Beijing BOE Display Technology Co., Ltd., Beijing (CN)

(72) Inventors: Yupeng Wang, Beijing (CN); Hongming Zhan, Beijing (CN); Honglin Zhang, Beijing (CN); Chao Tian, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 687 days.

(21) Appl. No.: 14/339,560

(22) Filed: Jul. 24, 2014

(65) Prior Publication Data
US 2015/0267096 A1    Sep. 24, 2015

(30) Foreign Application Priority Data
Mar. 19, 2014    (CN) .......................... 2014 1 0103599

(51) Int. Cl.
C09K 3/10       (2006.01)
G02F 1/1339     (2006.01)
G02F 1/1341     (2006.01)

(52) U.S. Cl.
CPC .......... C09K 3/1006 (2013.01); G02F 1/1339 (2013.01); B32B 2457/202 (2013.01);
(Continued)

(58) Field of Classification Search
CPC .......... C09K 3/1006; C09K 2200/0647; C09K 2200/0625; C09K 2003/1059; G02F 1/1339; G02F 1/1341; G02F 2001/13398; Y10T 428/1059; Y10T 428/1073; Y10T 428/31515; Y10T 428/1077; B32B 2457/202
See application file for complete search history.

(56) References Cited

U.S. PATENT DOCUMENTS 5,150,239 A *  9/1992  Watanabe .......... C08G 59/4035
                                                   349/153
6,667,148 B1 * 12/2003  Rao .................... G03C 1/49872
                                                   430/350
(Continued)

FOREIGN PATENT DOCUMENTS

CN       1798820 A      7/2006
CN     101030544 A      9/2007
(Continued)

OTHER PUBLICATIONS

First Chinese Office Action for Chinese Patent Application No. 201410103599.1, dated Jun. 1, 2015, 7 pages.

*Primary Examiner* — Eli D Strah
(74) *Attorney, Agent, or Firm* — Westman, Champlin & Koehler, P.A.

(57) ABSTRACT

The invention discloses a frame-sealing agent, a display panel and a display device. The frame-sealing agent comprises an acrylic resin, an epoxy resin, a thermal curing agent and an ultraviolet photoinitiator, wherein the frame-sealing agent further comprises a compound which decomposes to produce a gas under a condition of light irradiation, heating or high temperature. In the invention, by providing a compound that decomposes to produce a gas under a condition of light irradiation, heating or high temperature, when the frame-sealing agent is cured, the compound decomposes to produce a gas with the effect of light irradiation, heating or high temperature. The light leak of the display screen at the position of backlight is obstructed by the gas. Additionally, the pressure of the gas can retard the diffusion of liquid crystal molecules, so that the contamination of the liquid crystal caused by the too early contact between the liquid crystal and the frame-sealing agent and the relevant display badness are avoided.

6 Claims, 1 Drawing Sheet

(52) U.S. Cl.
CPC ............ *C09K 2003/1059* (2013.01); *C09K 2200/0625* (2013.01); *C09K 2200/0647* (2013.01); *G02F 1/1341* (2013.01); *G02F 2001/13398* (2013.01); *Y10T 428/1059* (2015.01); *Y10T 428/1073* (2015.01); *Y10T 428/1077* (2015.01); *Y10T 428/31515* (2015.04)

(56) References Cited

U.S. PATENT DOCUMENTS

| 7,125,461 | B2 | 10/2006 | Czaplicki et al. | |
|---|---|---|---|---|
| 2013/0017391 | A1 | 1/2013 | Kato et al. | |
| 2013/0271714 | A1* | 10/2013 | Hirota | G02F 1/1339 349/139 |
| 2013/0329460 | A1 | 12/2013 | Mathew et al. | |
| 2015/0133572 | A1* | 5/2015 | Yamamoto | C08J 9/0061 521/95 |

FOREIGN PATENT DOCUMENTS

| CN | 102650753 | A | | 8/2012 | |
|---|---|---|---|---|---|
| CN | 102827352 | A | * | 12/2012 | ............ C08G 59/64 |
| EP | 1 006 395 | A1 | | 6/2000 | |
| JP | 2003-137611 | A | | 5/2003 | |
| JP | 2005-242245 | A | | 9/2005 | |
| JP | 2013-36026 | A | | 2/2013 | |
| WO | WO 2012165216 | A1 | * | 12/2012 | ............ C08J 9/0061 |

\* cited by examiner

FRAME-SEALING AGENT, DISPLAY PANEL AND DISPLAY DEVICE

CROSS-REFERENCE TO RELATED APPLICATION

This Application is a non-provisional Application of Chinese Application No. CN 201410103599.1, filed Mar. 19, 2014, in Chinese, the contents of which are hereby incorporated by reference in their entirety.

FIELD OF THE INVENTION

The invention relates to the technical field of display, in particular, to a frame-sealing agent, a display panel and a display device.

BACKGROUND OF THE INVENTION

At the present time, with the development of the narrow-frame displays, the distance between the liquid crystal and the frame-sealing agent becomes smaller and smaller, and it is unavoidable that the liquid crystal comes into contact with the frame-sealing agent so as to result in contamination. Additionally, during practical applications and experimental tests of such displays, it has been found that the phenomenon of light leak would occur, because the display screen interferes with the backlight coming into contact therewith due to the warping caused by the shrinkage of the polarizing plate. Both of the contamination of the liquid crystal and the light leak of the display screen mentioned above would seriously influence the quality of a display.

SUMMARY OF THE INVENTION (I) Technical Problem to be Solved

The technical problem to be solved by the invention is to reduce two problems existing in prior art, i.e. the phenomenon of light leak of display screen and the contamination caused by the contact between the liquid crystal and the frame-sealing agent.

(II) Technical Solution

In order to solve the above-mentioned technical problem, the invention provides a frame-sealing agent, comprising an acrylic resin, an epoxy resin, a thermal curing agent and an ultraviolet photoinitiator, wherein the frame-sealing agent further comprises a compound which decomposes to produce a gas under a condition of light irradiation, heating or high temperature.

Preferably, the compound comprises a metal halide.

Preferably, the compound further comprises at least one of ammonium carbonate, potassium permanganate, potassium chlorate and ethylbenzene.

Preferably, when the compound comprises ethylbenzene, the frame-sealing agent further comprises a catalyst.

Preferably, the catalyst is CuO.

Preferably, the metal halide is a silver halide, wherein the halogen is Cl, Br or I.

The invention further provides a display panel, comprising a first substrate, a second substrate, and a frame-sealing agent of any one of those mentioned above cured between the first substrate and the second substrate.

Preferably, the display panel is a crystal liquid display panel further comprising a liquid crystal layer disposed between the first substrate and the second substrate; and after being cured, the frame-sealing agent forms a supporting structure provided at the periphery of liquid crystal layer.

Preferably, wherein an outer layer frame-sealing agent is further formed at the periphery of the supporting structure, and the outer layer frame-sealing agent is provided between the first substrate substrate and the second substrate, and the outer layer frame-sealing agent consists of an acrylic resin, an epoxy resin, a thermal curing agent and an ultraviolet photoinitiator.

The invention further provides a display device, comprising a display panel of any of those mentioned above.

(III) Beneficial Effects

The above-mentioned technical solutions have following advantages. By providing a compound that decomposes to produce a gas under a condition of light irradiation, heating or high temperature, when the frame-sealing agent is cured, the compound decomposes to produce a gas with the effect of light irradiation, heating or high temperature. The light leak of the display screen at the position of backlight is obstructed by the gas. Additionally, the pressure of the gas can retard the diffusion of liquid crystal molecules, so that the contamination of the liquid crystal caused by the too early contact between the liquid crystal and the frame-sealing agent and the relevant display badness are avoided.

Figure 1:
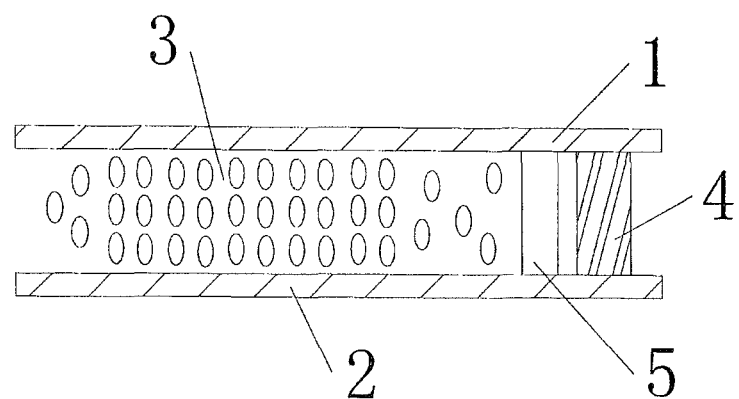
FIG. 1 is a schematic of the structure of a display panel according to an embodiment of the invention.

Wherein, 1: the first substrate; 2: the second substrate; 3: the liquid crystal layer; 4: the outer layer frame-sealing agent; 5: the inner layer frame-sealing agent; 6: the ultraviolet light.

DETAILED DESCRIPTION OF THE INVENTION

The embodiments of the invention will be described below further in details by referring drawings and examples. The following examples are used to illustrate the invention, but not to limit the scope of the invention.

In order to solve two problems in prior art, i.e. the phenomenon of light leak, which is caused by the interference with the backlight coming into contact therewith due to the warping caused by the shrinkage of the polarizing plate, and the contamination of the liquid crystal, which is caused by the contact between the liquid crystal and the frame-sealing agent, the invention proposes an improved frame-sealing agent. On the basis of the existing conventional frame-sealing agents, a compound, which decomposes to produce a gas under a condition of light irradiation, heating or high temperature, is added into the frame-sealing agent, so that the light leak is obstructed by the resultant gas, and thus the disadvantageous effects of the light leak on the display quality of the display device is avoided, and the contamination of liquid crystal molecules is reduced by means of preventing the liquid crystal molecules from approaching the frame-sealing agent too quickly with the pressure of the gas.

Example 1

The present example provides an improved frame-sealing agent, which is improved on the basis of the existing conventional frame-sealing agents. Typically, the existing conventional frame-sealing agent comprises an acrylic resin, an epoxy resin, a thermal curing agent and an ultraviolet photoinitiator. On the basis of the ingredients in prior art, the improved frame-sealing agent has a compound added therein, which decomposes to produce a gas under a condition of light irradiation, heating or high temperature. By means of the compound added, it can be achieved that during the curing process of the frame-sealing agent, the compound decomposes by the effects of corresponding external conditions, so as to produce a gas, which can obstruct the light leak of the display screen at the position of backlight. Additionally, the pressure of the gas can retard the diffusion of the liquid crystal molecules, so that the contamination of the liquid crystal caused by the too early contact between the liquid crystal and the frame-sealing agent and the relevant display badness are avoided.

The above-mentioned compound is preferably a metal halide that decomposes under light, so that the improved frame-sealing agent can, after decomposing under light, produce a halogen gas, such as chlorine gas, bromine gas and iodine gas, and exhibit yellow-green color, brown color and purple color, respectively. A gas with color can further obstruct the light leak of the display screen at the position of backlight.

Silver halide is preferably adopted as the above-mentioned metal halide. Silver halide not only decomposes under light, but also produces elemental silver after decomposing. The elemental silver has strong stability, and will not cause bad effects on the application environment thereof. The equation of the decomposition of a silver halide under light is as follows:

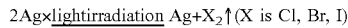

2Agx <u>light irradiation</u> Ag+X$_2$↑(X is Cl, Br, I)

Further, the frame-sealing agent can further comprise ethylbenzene. Ethylbenzene can reversibly react to produce hydrogen gas. The pressure derived from the hydrogen gas can allow the pressure in the liquid crystal cell stable, and avoid the contamination of the liquid crystal. The equation of the reversible reaction of the ethylbenzene is as follows:

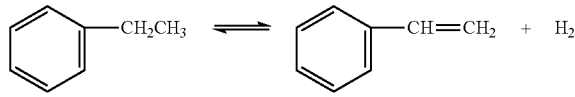

Concerning the reversible reaction, the rate of the reverse reaction can be too slow. Therefore, a small amount of CuO as a catalyst can be further doped in the frame-sealing agent in order to increase the rate of the reverse reaction and ensure the stable generation of the hydrogen gas.

A compound, such as ammonium carbonate, potassium permanganate or potassium chlorate and the like, can also produce a gas by decomposing under heating or at a high temperature. By means of controlling the pressure around the liquid crystal panel, the diffusion of the liquid crystal is controlled, so as to serve for reducing the risk of contamination. In the ingredients of the frame-sealing agent, at least one of the three substances, i.e. ammonium carbonate, potassium permanganate and potassium chlorate, can be comprised. The equations for producing gas by their decomposition under heating are as follows, respectively:

(NH$_4$)$_2$CO$_3$ $\underline{\Delta}$ 2NH$_3$+H$_2$O+CO$_2$↑

2KClO$_3$ $\underline{\Delta}$ 2KCl+3O$_2$↑

2KMnO$_4$ $\underline{\Delta}$ K$_2$MnO$_4$+MnO$_2$+O$_2$↑

In the present example, when the improved frame-sealing agent is applied in a liquid crystal cell, the gas produced by irradiating the material added with light or a reversible reaction would not contaminate the liquid crystal, and thus can ensure a good display quality of the display panel.

Example 2

On the basis of the improved frame-sealing agent in Example 1, the present example provides a display panel having a schematic of structure as shown in FIG. 1, and comprising a first substrate 1, a second substrate 2 and a frame-sealing agent as mentioned in Example 1 cured between the first substrate 1 and the second substrate 2.

Here, the display panel is a liquid crystal display panel, which further comprises a liquid crystal layer 3 disposed between the first substrate 1 and the second substrate 2, and after being cured, the frame-sealing agent forms a supporting structure disposed at the periphery of the liquid crystal layer.

Figure 2:
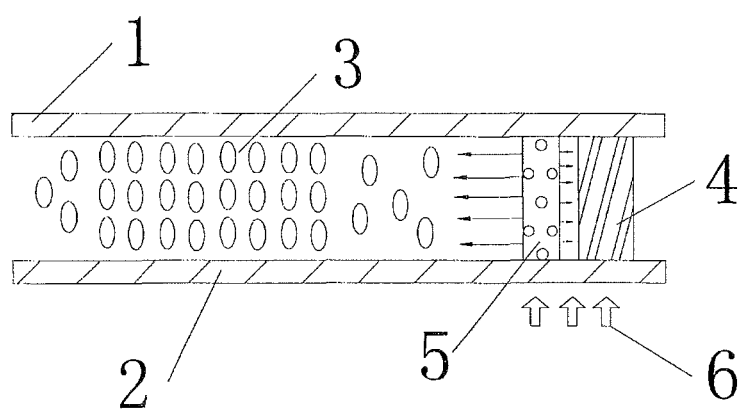
FIG. 2 is a drawing showing the state of the frame-sealing agent in the display panel in FIG. 1, when it is irradiated by light.

As shown in FIG. 2, after the frame-sealing agent is applied between the first substrate 1 and the second substrate 2, during the curing process of the frame-sealing agent, the frame-sealing agent will be affected by light irradiation or high temperature. Further, a gas will be produced from the frame-sealing agent, so as to obstruct the light leak of the display screen at the position of backlight. The pressure of the gas can retard the diffusion of the molecules of the liquid crystal, so that the contamination of the liquid crystal caused by the too early contact between the liquid crystal and the frame-sealing agent and the relevant display badness are avoided.

For example, when the curing of the frame-sealing agent is achieved by the irradiation of a ultraviolet light 6, the irradiation of the ultraviolet light can allow the metal halide in the frame-sealing agent to react to produce a halogen gas, such as chlorine gas, bromine gas and iodine gas, which exhibit yellow-green color, brown color and purple color, respectively. The gas with color can avoid the phenomenon of light leak, which is caused by the interference with the backlight coming into contact therewith due to the warping caused by the shrinkage of the polarizing plate in the display panel. Additionally, the pressure of the resultant gas can retard the diffusion of the liquid crystal molecules, avoid the contamination of the liquid crystal caused by the too early contact between the liquid crystal and the frame-sealing agent, and further influence the display quality of the display panel.

Further, the frame-sealing agents supported between the first substrate 1 and the second substrate 2 is provided in a manner of two layers, which include an outer layer frame-sealing agent 4 and an inner layer frame-sealing agent 5, which are formed at the periphery of the first substrate 1 and the second substrate 2. The outer layer frame-sealing agent 4 is located at the periphery of the inner layer frame-sealing agent 5. The inner layer frame-sealing agent 5 adopts the improved frame-sealing agent described in Example 1. The outer layer frame-sealing agent 4 adopts the existing conventional frame-sealing agents, namely a frame-sealing agent formed of an acrylic resin, an epoxy resin, a thermal curing agent and an ultraviolet photoinitiator, so as to avoid the gas produced during the curing process of the inner layer frame-sealing agent 4 to diffuse simultaneously in both directions (as indicated by the arrows at the both sides of the inner layer frame-sealing agent 4 in FIG. 2). The reaction process will produce a large number of pores in the inner layer frame-sealing agent 4 and influence the sealing ability of the display. The outer layer frame-sealing agent 5 can serve for the airtightness. The inner layer frame-sealing agent 4 mainly serves for protecting the liquid crystal molecules.

The both problems, i.e. the phenomenon of light leak and the tendency of the contamination of the liquid crystal molecules, are significantly improved in the display panel formed in the present example.

Example 3

On the basis of Example 2, the present example provides a display device, comprising the display panel described in Example 2. Here, the structure of the liquid crystal panel refers to the example of the display panel mentioned above, and is not repeatedly stated any more. Additionally, the structures of the other parts of the display device refer to the prior art, and are not described in details herein. This display device can be any product or component having the function of display, such as a liquid crystal panel, an electronic paper, a liquid crystal television, a liquid crystal display, a digital photo frame, a mobile telephone, a tablet computer, or the like.

Those mentioned above are only preferable embodiments of the invention. It should be pointed out that on the premise of without departing from the technical principle of the invention, those skilled in the art can make improvements and replacements, which are also regarded as falling into the protection scope of the invention.

What is claimed is:

1. A display panel comprising a first substrate, a second substrate, and a frame-sealing agent cured between the first substrate and the second substrate, wherein the frame-sealing agent comprises an acrylic resin, an epoxy resin, a thermal curing agent, an ultraviolet photoinitiator, a silver halide wherein the halogen is Cl, Br or I, and at least one selected from the group consisting of ammonium carbonate, potassium permanganate, potassium chlorate and ethylbenzene.

2. The display panel of claim 1, wherein when the frame-sealing agent comprises ethylbenzene, the frame-sealing agent further comprises a catalyst.

3. The display panel of claim 2, wherein the catalyst is CuO.

4. The display panel of claim 1, wherein the display panel is a liquid crystal display panel further comprising a liquid crystal layer disposed between the first substrate and the second substrate; and after being cured, the frame-sealing agent forms a supporting structure provided at the periphery of the liquid crystal layer.

5. The display panel of claim 4, wherein an outer layer frame-sealing agent is further formed at the periphery of the supporting structure, and the outer layer frame-sealing agent is provided between the first substrate and the second substrate, and the outer layer frame-sealing agent consists of an acrylic resin, an epoxy resin, a thermal curing agent and an ultraviolet photoinitiator.

6. A display device, comprising the display panel of claim 1.

* * * * *